US010282750B2

(12) United States Patent
Carre et al.

(10) Patent No.: US 10,282,750 B2
(45) Date of Patent: May 7, 2019

(54) APPARATUS AND METHOD FOR SYNCHRONISING ADVERTISEMENTS

(71) Applicant: Twitter, Inc., San Francisco, CA (US)

(72) Inventors: Lee Andrew Carre, Bristol (GB); Daniel Fairs, Bristol (GB); Andrew Wheatley Littledale, Bristol (GB); Edward Robert Littledale, Bristol (GB)

(73) Assignee: Twitter, Inc., San Francisco, CA (US)

( * ) Notice: Subject to any disclaimer, the term of this patent is extended or adjusted under 35 U.S.C. 154(b) by 1002 days.

(21) Appl. No.: 14/374,217

(22) PCT Filed: Jan. 31, 2013

(86) PCT No.: PCT/GB2013/050218
§ 371 (c)(1),
(2) Date: Jul. 23, 2014

(87) PCT Pub. No.: WO2013/114117
PCT Pub. Date: Aug. 8, 2013

(65) Prior Publication Data
US 2015/0149281 A1 May 28, 2015

(30) Foreign Application Priority Data

Feb. 3, 2012 (GB) .................................. 1201921.2

(51) Int. Cl.
G06Q 30/00 (2012.01)
G06Q 30/02 (2012.01)
(Continued)

(52) U.S. Cl.
CPC ... *G06Q 30/0256* (2013.01); *H04N 21/23418* (2013.01); *H04N 21/242* (2013.01);
(Continued)

(58) Field of Classification Search
None
See application file for complete search history.

(56) References Cited

U.S. PATENT DOCUMENTS

2002/0099556 A1* 7/2002 Xia .................... G06Q 20/20
715/206
2002/0171686 A1* 11/2002 Kamen .............. G06F 3/04815
715/850
(Continued)

FOREIGN PATENT DOCUMENTS

WO WO 2009/082784 A1 7/2009
WO WO 2011/017311 A1 2/2011

OTHER PUBLICATIONS

Ayur, S. et al., "Predicting the Future with Social Media," 2010 IEEE/WIC/ACM International Conference on Web Intelligence and Intelligent Agent Technology (WI-IAT), Aug. 31, 2010, pp. 492-499.

(Continued)

*Primary Examiner* — Matthew T Sittner
(74) *Attorney, Agent, or Firm* — Fish & Richardson P.C.

(57) ABSTRACT

An apparatus and method for synchronising advertisements published on a group communications network with advertisements in a broadcast, the apparatus comprising: a receiver for receiving broadcast data; a communications interface in communication with a group communications network; a broadcast data content extractor adapted to derive search terms and advert data from the received broadcast data, the advert data relating to an advert received in the broadcast data, wherein on receipt of a query by a user of the group communications network, the query comprising one or more of the search terms, the communications interface publishes a group communication comprising at least a portion of the advert data on the group communications network.

28 Claims, 11 Drawing Sheets

(51) Int. Cl.

| | | |
|---|---|---|
| *H04N 21/234* | (2011.01) | |
| *H04N 21/242* | (2011.01) | |
| *H04N 21/25* | (2011.01) | |
| *H04N 21/2665* | (2011.01) | |
| *H04N 21/44* | (2011.01) | |
| *H04N 21/462* | (2011.01) | |
| *H04N 21/4788* | (2011.01) | |
| *H04N 21/658* | (2011.01) | |
| *H04N 21/84* | (2011.01) | |

(52) U.S. Cl.
CPC ....... *H04N 21/251* (2013.01); *H04N 21/2665* (2013.01); *H04N 21/44008* (2013.01); *H04N 21/4622* (2013.01); *H04N 21/4788* (2013.01); *H04N 21/6582* (2013.01); *H04N 21/84* (2013.01)

(56) References Cited

U.S. PATENT DOCUMENTS

| | | | | |
|---|---|---|---|---|
| 2005/0203821 | A1* | 9/2005 | Petersen | G06Q 30/0281 705/36 R |
| 2006/0085251 | A1* | 4/2006 | Greene | G06Q 30/02 705/14.53 |
| 2007/0043709 | A1* | 2/2007 | Strassmann | G06F 17/30386 |
| 2008/0015938 | A1* | 1/2008 | Haddad | G06Q 20/387 705/14.38 |
| 2008/0114607 | A1* | 5/2008 | Amer-Yahia | G06Q 30/02 705/14.4 |
| 2008/0313040 | A1* | 12/2008 | Rose | G06O 30/02 705/14.69 |
| 2009/0076905 | A1* | 3/2009 | Kraft | G06Q 30/02 705/14.25 |
| 2009/0287572 | A1* | 11/2009 | Whelan | G06Q 30/02 705/14.55 |
| 2009/0319936 | A1* | 12/2009 | Alva | G06Q 10/087 715/776 |
| 2010/0058417 | A1 | 3/2010 | Rondeau et al. | |
| 2010/0082778 | A1* | 4/2010 | Muilenburg | G06Q 10/06 709/220 |
| 2010/0088394 | A1 | 4/2010 | Barbieri et al. | |
| 2010/0332330 | A1 | 12/2010 | Goel et al. | |
| 2011/0025816 | A1* | 2/2011 | Brewer | G06Q 30/02 348/14.02 |
| 2011/0066507 | A1 | 3/2011 | Iyer et al. | |
| 2011/0078055 | A1* | 3/2011 | Faribault | G06Q 30/02 705/27.2 |
| 2011/0093323 | A1* | 4/2011 | Prus | G06Q 30/02 705/14.26 |
| 2011/0106613 | A1* | 5/2011 | Felt | G01C 21/00 705/14.46 |
| 2011/0106615 | A1* | 5/2011 | Churchill | G06Q 30/02 705/14.49 |
| 2011/0225034 | A1* | 9/2011 | Bayat | G06Q 30/02 705/14.36 |
| 2011/0282741 | A1* | 11/2011 | Park | G06Q 30/02 705/14.54 |
| 2012/0101944 | A1* | 4/2012 | Lin | G06F 21/554 705/44 |
| 2012/0123854 | A1* | 5/2012 | Anderson | G06Q 30/02 705/14.43 |
| 2012/0130788 | A1* | 5/2012 | Winslade | G06Q 30/02 705/14.23 |
| 2012/0253943 | A1* | 10/2012 | Chow | G06Q 30/0255 705/14.69 |
| 2012/0284104 | A1* | 11/2012 | Keenan | G06Q 30/02 705/14.23 |
| 2013/0013401 | A1* | 1/2013 | Kim | G06Q 10/10 705/14.49 |
| 2013/0144715 | A1* | 6/2013 | Kranzley | G06Q 30/0251 705/14.49 |
| 2013/0211890 | A1* | 8/2013 | Heitmueller | G06Q 30/0207 705/14.13 |
| 2013/0311357 | A1* | 11/2013 | Kring | G06Q 30/0601 705/39 |
| 2014/0074833 | A1* | 3/2014 | Adams | G06F 17/30587 707/736 |
| 2014/0330645 | A1* | 11/2014 | Craft | G06Q 30/0255 705/14.53 |
| 2017/0213243 | A1* | 7/2017 | Dollard | G06Q 30/0249 |

OTHER PUBLICATIONS

Mateosian, R., "Micro Review: Twitter," IEEE Micro, IEEE Service Center, Los Alamitos, CA, US, Jul. 1, 2009, pp. 87-88, vol. 29, No. 4.

PCT International Search Report and Written Opinion, PCT Application No. PCT/GB2013/050218, dated Apr. 24, 2013, 14 pages.

* cited by examiner

APPARATUS AND METHOD FOR SYNCHRONISING ADVERTISEMENTS

FIELD OF THE INVENTION

The invention relates to an apparatus and method for synchronising advertisements published on a group communications network with advertisements in a broadcast.

BACKGROUND TO THE INVENTION

Methods of analysing the effect of media broadcasts on public opinion are currently limited to simple and somewhat archaic methods, such as public opinion polls and the inferences of experienced academics.

These methods depend on a high volume of man hours for collation and analysis of data. Moreover, in the fast-paced world of TV and radio such methods have considerably lag, and often lead to inaccurate results.

SUMMARY OF THE INVENTION

According to a first aspect of the invention, there is provided an apparatus for synchronising advertisements published on a group communications network with advertisements in a broadcast, the apparatus comprising: a receiver for receiving broadcast data; a communications interface in communication with a group communications network; a broadcast data content extractor adapted to derive search terms and advert data from the received broadcast data, the advert data relating to an advert received in the broadcast data, wherein on receipt of a query made by a user of the group communications network, the query comprising one or more of the search terms, the communications interface publishes a group communication comprising at least a portion of the advert data on the group communications network.

Accordingly, publication in a group communications network of group communications related to particular products or services may be synchronised with the advertisement of the same products or services in a broadcast, such as a TV or radio broadcast. A user who is watching a particular broadcast containing an advert who, at the same time, queries the group communication network for information concerning that broadcast, can thus be subjected to synchronised advertising from both the broadcast and the group communication network.

Preferably, the group communication is returned as a result of the query. Thus, a group communications comprising the advert data may be published directly to the user's group communications network client and received by the user preferably within a few seconds of an advert airing on the broadcast.

The search terms are preferably derived from broadcast listings data extracted from the received broadcast data. Thus, promoted group communications can be linked to search terms which a user is likely to input when searching for group communications relating to a particular programme in the broadcast. Promoted group communications may be group communications which are forced to be returned at the top of search results provided to the user in response to his/her query.

To maximise the synchrony of adverts received via the broadcast and the group communications network, the group communication may be published within a time period T from receipt of the advert data from the receiver. This time may be zero or substantially zero. Alternatively, T may be equal to the duration of the advert, such that the same promoted message is repeatedly published until the advert data on the broadcast relates to a different product. This change may correspond with the start of a new advert in a commercial break.

The group communication published on the group communications network may only be visible to users who have not yet viewed a related group communication comprising the portion of the advert data. Accordingly, users who have already been subject to a group communication relating to broadcast advert data may not be subject to the same advert twice.

The apparatus may further comprise an adaptive search engine arranged to filter a stream of communications being received by the communications interface using one or more of the search terms to derive a sub-stream of communications, and extract one or more additional search terms from the sub-stream of communications based on the content of the sub-stream. Accordingly, a larger base of search terms relating to a particular broadcast may be collated. The additional search terms may be included in the one or more search terms. Thus when the query is received at the group communications interface comprising one or more of the additional search terms, a group communication comprising at least a portion of the advert data may be published on the group communications network. Accordingly, a larger portion of users may be subject to a synchronised advertisement via both the broadcast and the group communications network.

The one or more additional search terms may be extracted based on the frequency of their appearance in communications in the sub-stream of communications over a period W. Thus terms which turn up in subsequent group communications relating to a particular program may be identified as additional search terms. Alternatively or additionally, extraction of additional search terms may depend on the probability of their appearance in subsequent communications in the sub-stream based on the frequency of their appearance in previous communications in the sub-stream.

The broadcast data may be received via one or more of an antenna, an internet protocol, a digital subscriber line, a digital cable, a digital satellite and a user input and may include one or more of a subtitle stream, a voice stream, a video stream and broadcast listings data.

According to a second aspect of the invention, there is provided a method for synchronising advertisements published on a group communications network with advertisements in a broadcast, the method comprising: receiving broadcast data; receiving communications from a group communications network; deriving search terms and advert data from the received broadcast data, the advert data relating to an advert received in the broadcast data; and in response to a query at the group communications network, publishing a group communication comprising advertising data associated with the derived advert data.

According to a third aspect of the invention, there is provided a computer program adapted to perform the method according to the second aspect of the invention.

BRIEF DESCRIPTION OF THE DRAWINGS

Embodiments of the invention will now be described by way of non-limiting example only, with reference to the accompanying drawings, in which.

DESCRIPTION OF EMBODIMENTS

In general, the present invention provides an apparatus and method for comparing data from a audio/visual (A/V) stream, such as a broadcast, with data from a communication network, such as an internet based communication service. In particular, the content of feeds from social networking websites such as Twitter and Facebook, being examples from 2012, can be analysed, preferably in real time, for mentions of key phrases or words relevant to data or programs broadcast on a particular A/V broadcast. In the instance of television, this may include listings containing descriptions and titles of programs being aired, and/or the subjects people are talking about on TV programs at any particular point in time.

The present invention provides the ability to direct sponsored messages or advertising to a user searching for a particular term on a group communications network. The present invention may allow for such directed advertising to be synchronised with advertising surrounding an A/V broadcast to which the user's search term might relate.

The present invention may further provide the ability to analyse the sentiment of the users of, for example, an internet based communication service and match that sentiment with, for example, a particular TV program, person, place or product. Accordingly, a comprehensive understanding of the effect of a TV broadcast with regard to, for example, marketing, politics or any other arena can be extracted and displayed or otherwise reported to an end user.

Figure 1:
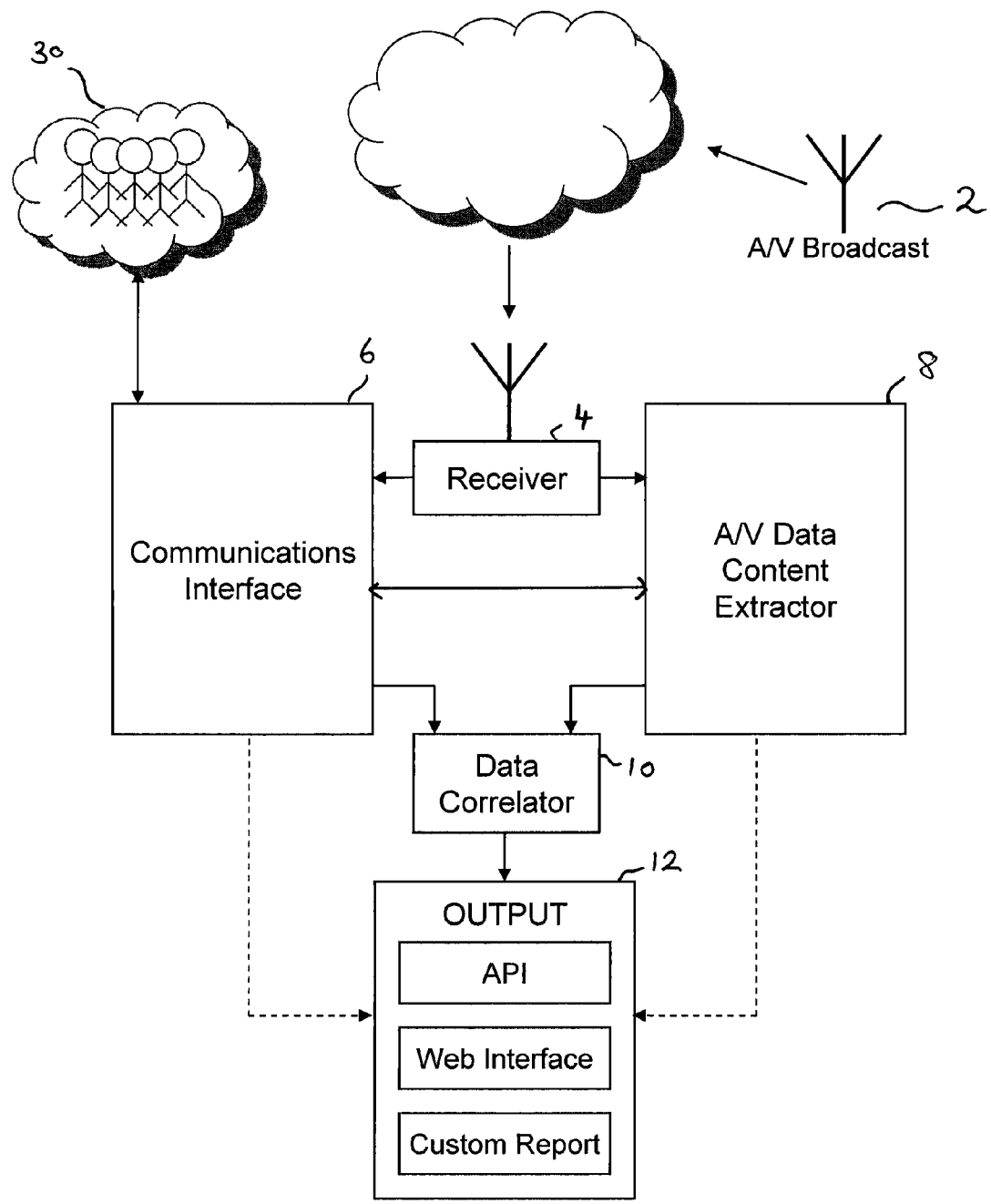
FIG. 1 is a block diagram of a system according to an embodiment of the present invention.

FIG. 1 illustrates an apparatus constituting an embodiment of the present invention. The apparatus comprises a receiver 4, an communications interface 6, an audio/visual (A/V) content extractor 8, a data correlator 10 and an output 12.

An audio visual (A/V) broadcast 2 is transmitted using any suitable known transmission method. Transmission is represented in FIG. 1 by an antenna, however the A/V broadcast could also be transmitted via internet protocol (IP), a digital subscriber line (DSL), digital optic cable or digital satellite, as non-limiting examples of public broadcast media. In the embodiments described herein, the broadcast may be NTSC or PAL and/or a digital television (DTV) broadcast which may be high definition (HD) or standard definition (SD) and transmitted in any known format. In other embodiments however, the broadcast may be a digital radio broadcast or a non-live broadcast, such as a podcast. In which case, it will be appreciated that no video data is transmitted, the broadcast consisting only of audio data and optionally broadcast programming or scheduling information. The system described herein with respect to full A/V signals can also apply to audio only transmissions, with the techniques described herein in respect of audio signals being utilised independently of video.

The A/V broadcast is received at a receiver 4 via any suitable protocol known in the art. The receiver 4 receives and decodes the digital broadcast into an A/V data stream preferably compressed using a known standard, for example MPEG-2 or MPEG-4.

The decoded A/V data stream may either be passed straight from the receiver 4 into an communications interface 6 and A/V data content extractor (A/V DCE) 8, or alternatively the data may be recorded in a storage medium which may later pass the A/V data stream to the communications interface 6 and the A/V data content extractor 8. Accordingly embodiments may be implemented using either a live or a pre-recorded A/V broadcast or a combination of both.

Figure 2:
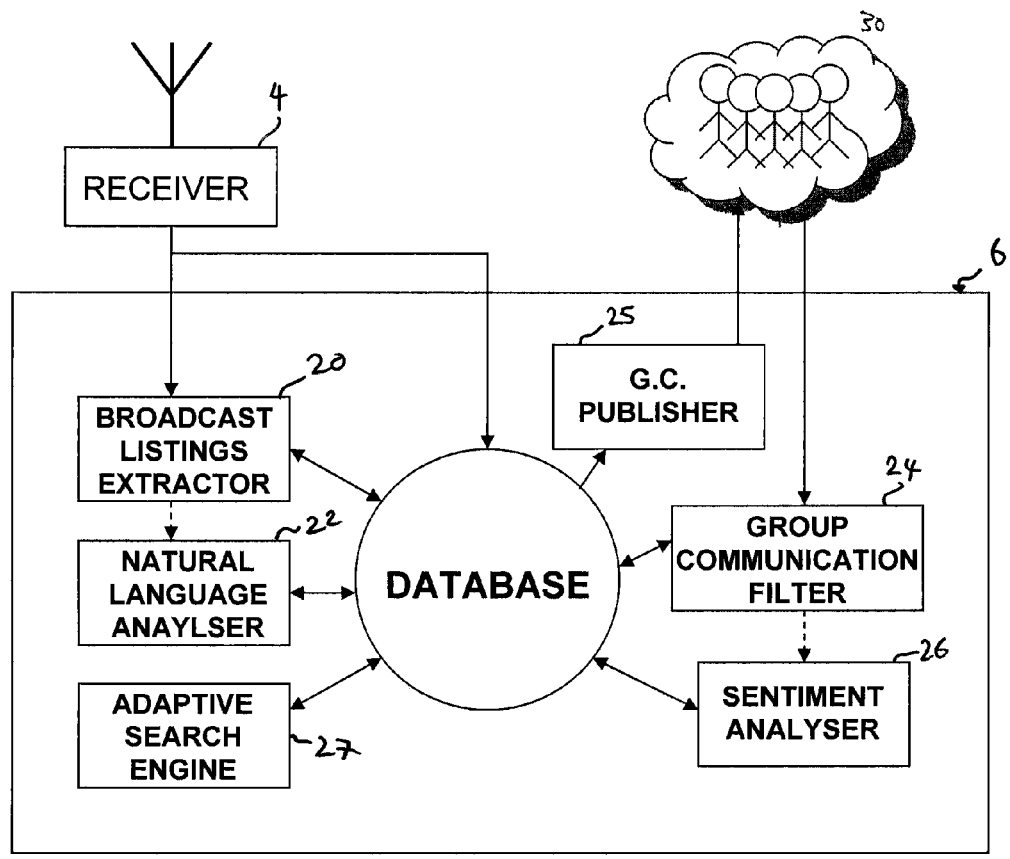
FIG. 2 shows a detailed view of the communications interface 6 of FIG. 1.

The communications interface 6, shown in more detail in FIG. 2, may be connected to a group communications network via the internet. The communications interface includes a broadcast listing extractor 20, a natural language analyser 22, a group communication filter 24, a sentiment analyser 26, an adaptive search engine 27, and a database 28 as shown in FIG. 2. The communications interface 6 may also include a group communication publisher 25.

Figure 5:
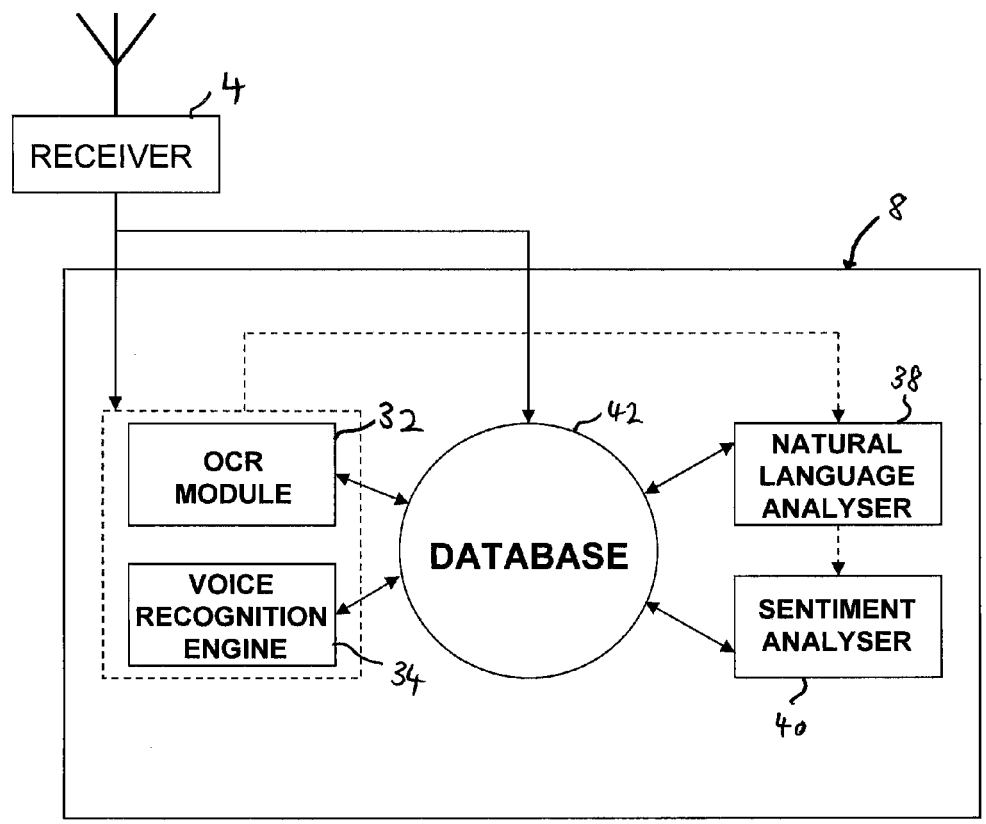
FIG. 5 shows a detailed view of the A/V data content extractor 8 of FIG. 1.

The decoded A/V data stream is also passed into an A/V data content extractor 8, shown in further detail in FIG. 5. The A/V data content extractor 8 may include one or more of an optical character recognition (OCR) module 32, and a voice recognition engine 34. In addition, the A/V data content extractor 8 may comprise a natural language analyser 38, a sentiment analyser 40 and a database 42.

Referring again to FIG. 1, data extracted by the communications interface 6 and the A/V data content extractor 8 is then fed into a data correlator 10 which correlates the two sets of data. For example, group communications extracted from a group communication network 30 may be correlated with extracted speech related text extracted from the A/V data content extractor 8. The A/V data content extractor 8 may also be adapted to extract information relating to advertising aired alongside and during A/V broadcasts. The communications interface 6 may then publish one or more group communications relating to the advert information on the group communication network 30, as will be described in more detail below.

Resultant data extracted by the communications interface 6, the A/V data content extractor 8 and the data correlator 10 may then be output at an output 7. This data may be output to an application program interface (API), a web interface or in a custom report.

Referring again to FIG. 2, the broadcast listings extractor 20 extracts broadcast listings data relating to current and future program listings for, for example, TV and/or radio channels either from the A/V broadcast or from any other known source. The broadcast listings data may be extracted directly from the A/V broadcast itself, or from alternative sources such as a television listings and electronic program guide data supplier. An example of such a supplier is Broadcast DataServices (BDS). The broadcast listings data is received via any suitable protocol known in the art. In a preferred embodiment, where the broadcast is a digital TV broadcast, the broadcast listing extractor 20 extracts data associated with the broadcast which may include the channel, title, description, series and any other information relevant to each listed program, either currently airing or scheduled to air in a set time period. The time period may vary depending on the time range for which broadcast listings data is broadcast by a particular broadcaster or data supplier. Preferably, the broadcast listing extractor 20 extracts the maximum range of data available.

Optionally, once extracted, the broadcast listings data is stored in the database 28 before being transferred to the natural language analyser 22. Alternatively, the broadcast listings data may be transferred directly to the natural language analyser 22 which forms part of the communications interface 6.

Natural Language Analysis (Broadcast Listings Data)

The natural language analyser 22 may be software or hardware based. An example of an open source software based analyser is NLTK (Natural Language Tool Kit). In a preferred embodiment, text strings are parsed by the natural language analyser 22 and tokenised into words and phrases. Each word and phrase may then be tagged using part-of-speech-tagging, which tags the tokenised words and phrases to denote which part of speech they represent. Combinations of words which represent phrases, full names or grouped nouns may be further tagged together as such. An example of this process is shown below.

Consider the sentence:
"Jeremy Clarkson likes the new Audi TT."
Once tokenised and part-of-speech tagged, the sentence may be represented as follows:
"{Jeremy /noun Clarkson /noun}/noun phrase
likes /verb
{the /determiner new /adjective {Audi /noun TT /noun}/noun phrase}/noun phrase"

Accordingly, tags which are extracted from the above sentence include Jeremy Clarkson, the new Audi TT and Audi TT.

Optionally, transformations of tags based on observations of the real world are performed. In real life, people tend to abbreviate words and phrases, for example writing Jeremy Clarkson as JC. Further, people may add a prefix to a word to associate it with a social media network or other group communication network. An example of this is the well known "#" prefix used by popular social networking websites such as Twitter to recognise an important element of a group communication. Accordingly, tags acquired by the natural language analyser 22 may be transformed into further tags (e.g. JC, ATT, #Jeremy Clarkson, #Audi TT etc). The skilled person will appreciate that other analysis and extraction techniques known in the art may be used to perform natural language analysis on the extracted text. It will be appreciated other methods of abbreviation are used by the public in real world situations, and above described techniques may be applicable to any present or future abbreviation trend. All acquired tags are then stored in a database, preferably alongside corresponding broadcast listings information including, for example, the scheduled time of airing of the program from which a tag was extracted, and the channel and series of that program.

Preferably, the natural language analyser 22 continues to process real time broadcast listings data whilst outstanding broadcast listings data exists which have not yet been processed. The broadcast listings extractor 20 may also repeat extraction of a portion of future data to check that no changes have been made to a programming schedule. If a change has been made, the broadcast listings extractor 20 may update the database and/or forward this information to the natural language analyser 22 for re-tagging of that portion of data.

It will be appreciated that an initialisation process should be performed at the start of the natural language analysis to populate the database with tags for at least the programs which are currently airing and preferably the programs scheduled to air next. Therefore, elements of the communications interface 6 described herein may not be functional until such time that the database 28 has been populated with tag data for all currently airing and upcoming programs. We shall assume herein that initialisation of the database has been performed using any method known to a person skilled in the art.

Group Communications Extraction

Once the database 28 has been populated with an acceptable set of tags, the group communication filter 24 filters one or more group communications networks 30 based on tags present in the database 28. Tags, which include keywords and keyphrases relating to the current A/V broadcast are used to filter through group communications from the group communications networks 30. In a preferred embodiment, at least one of the group communications networks 30 is a social networking website such as Facebook or Twitter. Equally however, the group communications network 30 may be any number of short message sources, for example a web feed such as RSS or any other known group communications network.

The group communication filter 24 searches through at least a portion of group communications and checks each communication to see if any of the tagged keywords or key phrases in the database 28 are present. Filtering is performed on a number of levels. The group communication filter 24 may check if any one tag matches a group communication. However, this may return a large search result with some ambiguities. If, for example, a tagged program is called "chill", it is very likely that a group communication containing the word "chill" is not referring to that tagged program. Preferably therefore, the filter 24 may then look for other tags relating to the program "chill" which are present in the same group communication. If, for example, a group communication matches a threshold value of tags, such as three or more tags related to the same program, then that group communication may be accepted as being relevant to that program. Alternatively or additionally, the filter 24 may check for the word in combination with a prefix, e.g. "#chill", signifying that a user is more likely to have meant the group communication to relate to a program named "chill". Alternatively or in addition, the filter 24 may check to see if a group communication contains a threshold number of multi-word tags, e.g. "BBC news", since it is more likely that a group communication containing the words "BBC" and "news" consecutively is referring to the program "The BBC News". In addition or alternatively, the filter 24 might look for a match of one or more multi-word tags, e.g. "BBC news" together with a match of a single word tag, e.g. "sailing" in a single group communication. The according likelihood that such a group communication is referring to sailing on The BBC News is high. It will be appreciated that some of these methods will be more effective on the filtration of group communications from different group communications networks 30. For example, group communications from Facebook tend to be longer and do not contain prefixes. For Facebook therefore, it may be more effective to employ a threshold search of multi-word/single-word tags. On the contrary, group communications received from a communications network 30 such as Twitter commonly contain prefixes to important words, e.g. "#Lad" and "@MadeInChelsea". Accordingly, the prefix type search approach may be more effective in filtering such group communications. It will be appreciated by a person skilled in the art that other methods of filtering are available in addition to those described above.

Once a group communication is accepted, it is stored in the database and is preferably linked to data, i.e. program information, to which it relates.

The group communication filter 24 accordingly produces a set or stream of group communications which relate specifically to particular A/V broadcasts, and are preferably channel and/or program specific. This filtered stream of communications will be referred to herein either as program specific group communications (PSGCs), group communications, or documents. The PSGCs or documents may be stored in the database 28, fed to the sentiment analyser 26 or passed to the adaptive search engine 27.

Adaptive Search

Generally, the adaptive search engine 27 may be configured to identify terms and phrases from a stream of communications or documents which are "trending", and adjust conditions of the group communications filter 24 to include those trending terms. A trending term may be regarded as one whose frequency of appearance in a given stream of documents increases sharply over a defined period of time. Using the revised filter conditions, the group communication filter 24 can the create new streams containing those trending terms which were derived from the initial stream.

Figure 3:
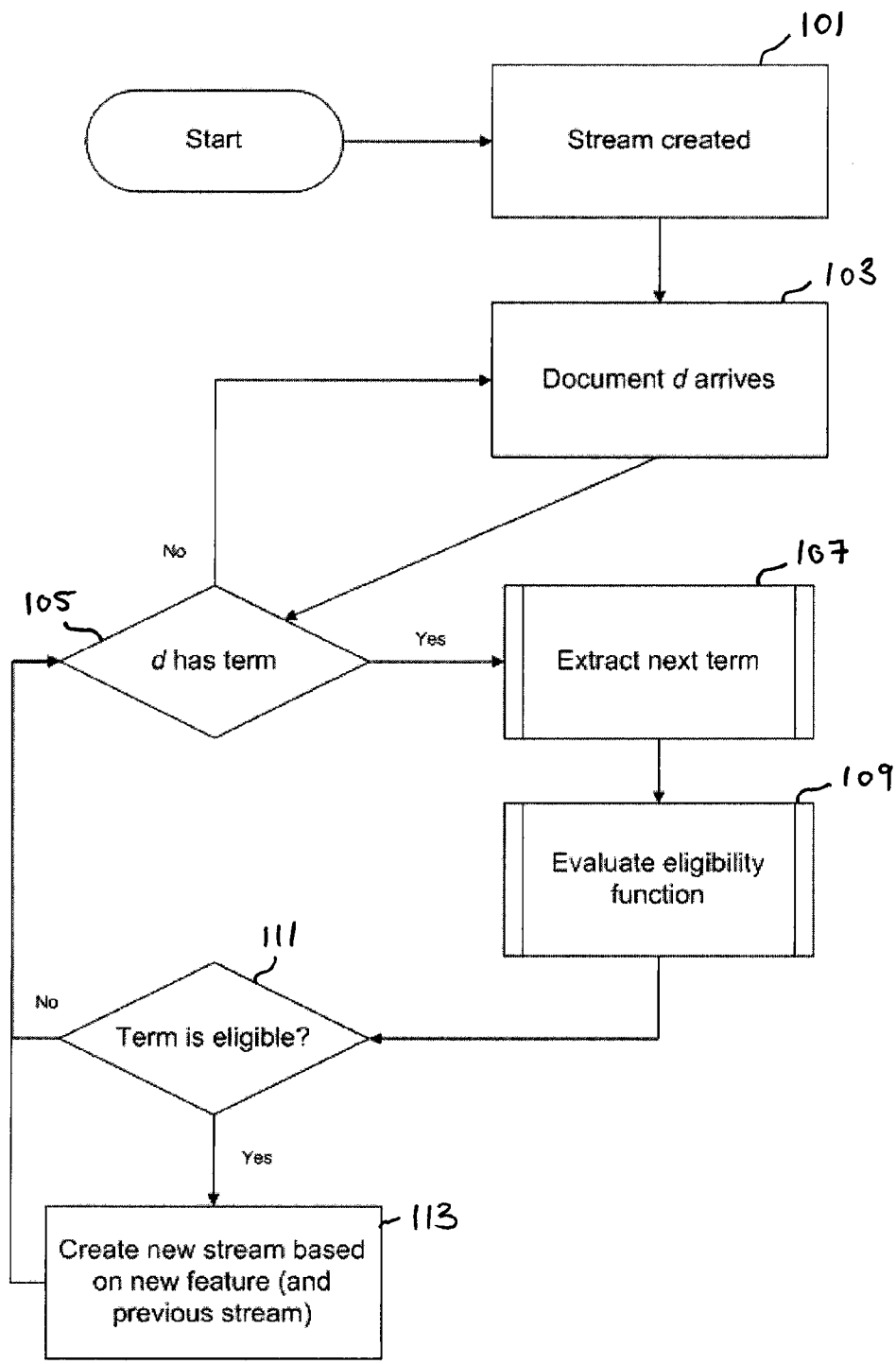
FIG. 3 is a flow diagram illustrating the function of the adaptive search engine shown in FIG. 2.

A method for performing such an adaptive search will now be described with reference to FIG. 3. As previously mentioned, an initial filter for social media interactions may be defined by a set of initial conditions in the group communication filter 24. At step 101, the group communication filter 24 may produce a stream $S_0$ of documents (communications). The function used by the group communication filter 24 may be defined as $S(ts_o)$ where $ts_o$ is a set of initial conditions.

The adaptive search engine 27 may receive the filtered stream $S_0$ of documents in real-time directly from the group communication filter 24 or alternatively from the database from the which the stream $S_0$ may have been stored. In either case, at step 103, the stream $S_0$ arrives at the adaptive search engine 27, which may then process the next document d of the stream $S_0$ using a term extraction function T(d). The term extraction function T(d) may return a set of normalised terms represented by that document. Terms may be arbitrary i.e. they may be bigrams, trigrams, or terms specific to the type of documents in the stream being processed (for example hash tags in social media interactions, or images of faces from a TV stream). The only constraint is that an extracted term must be meaningful to the group communication filter 24 and the conditions set therein.

The term extraction may be performed by the natural language analyser 22 as described above. The document received by the adaptive search engine 27 may be checked, at step 105, to see if it contains an initial term. This term may, for example be related to a particular A/V broadcast, such as the TV programme X-Factor, which will be used as an example hereafter. Where, for example, the stream represents a message broadcast on a group communications network such as Twitter, the term may be prefixed with a "#" or "@". In which case, the document d may also be searched for a concatenation of the initial term with "#" or "@". If the document d does not contain the initial term, the document in the stream is discarded and the process returns to step 103 where a new document arrives at the adaptive search engine

27. If the document d does contain the particular term, then at step 107 the natural language analyser 22 extracts terms from the next document, which may be set by the term extraction function T(d). The term extraction function may be performed using the natural language analyser 22 or the adaptive search engine 27, and may be predefined. For example, the extraction function could be set to extract other terms within the document which begin with the prefix "#". Alternatively, the natural language analyser 22 may be configured to extract nouns within the document which satisfy a series of criteria or are matched in a database of particular terms to be searched for.

At step 109, the extracted term is then evaluated using an eligibility function which may be defined as E(t,d). E(t,d) may be a Boolean function which for a given term in a set of documents may indicate whether that term is eligible to affect the future streams $S_n$ being extracted using the group communication filter 24. Whilst step 109 is shown as a single evaluation step, multiple eligibility functions may be active at any time, where any one function may indicate a term's eligibility. Additionally or alternatively, eligibility functions may be composed of one or more other eligibility functions. Eligibility functions may also be adapted to prevent consideration of terms present in a document which have also already been presented in a previous document already processed by the adaptive search function during a previous iteration. Two non-limiting examples of eligibility functions are described below.

Eligibility Function: Absolute Threshold

A threshold eligibility function may be defined in terms of a time window W and a threshold level V. If a given term has occurred at least V times in the last W seconds, then the function evaluates to a Boolean "true". Otherwise, the function evaluates to a Boolean "false". For example, assuming a document d has been annotated with extracted terms, a pseudo-code expression of the absolute threshold eligibility function would be as follows:

```
threshold(t, D) = count([d for d in recent(D, 30) if t is in
d.terms]) >= 10
```

Where V=10 and W=30 and D represents the stream of documents being analysed by the adaptive search engine 27. Thus, this function determines whether a particular term extracted by the natural language analyser 22 at step 107 has appeared in previous documents arriving at the adaptive stream engine in the last 30 seconds. If, in the last 30 seconds, 10 or more documents arriving at adaptive stream engine 27 contain a particular term, then that term may be considered eligible.

Eligibility Function: Proportion

A proportion eligibility function may be define in terms of a proportion P, such that 0>P>1, where a term is eligible if it appears in at least a proportion P of recent documents. For example, an eligibility function evaluates to Boolean "true" if a term appears in 40% of recent documents or more. The pseudo-code may be as follows.

```
recent(D, W) = [d for d in D if d.created_at > W seconds ago]
proportion(t, D) =
matching_documents := [d for d in recent(D, 60) if t is in d.terms];
return count(matching_documents) > count(recent_documents) x 0.4
```

Thus, the proportion eligibility function described above may only evaluate to true if a particular document contains a term which has already appeared in 40% of recent documents received by the adaptive search engine.

Once the chosen eligibility function E(t, d) has performed its analysis on the extracted term, at step 111, the adaptive search engine 27 may determine whether that particular extracted term is eligible. This may depend on whether or not the eligibility function returns a Boolean "true" or "false". If a term is evaluated and considered not eligible, the adaptive search engine 27 then returns to step 105 where it searches the same document for the next term. If, however, the eligibility function returns a "true", then that term may be added to list of eligible terms which may be stored in the database 28 or in other volatile or non-volatile memory. Based on this new extracted term and optionally also the previous stream $S_0$, a new stream may be created at step 113. Whilst on the first pass, the adaptive search engine 27 uses an initial single term to determine whether a document has a term (X-Factor is used in this example), in subsequent passes, additional terms may be added to the term list. These terms may include terms which are considered eligible at step 111 of the method or other terms added by an administrator during the stream search.

Figure 4:
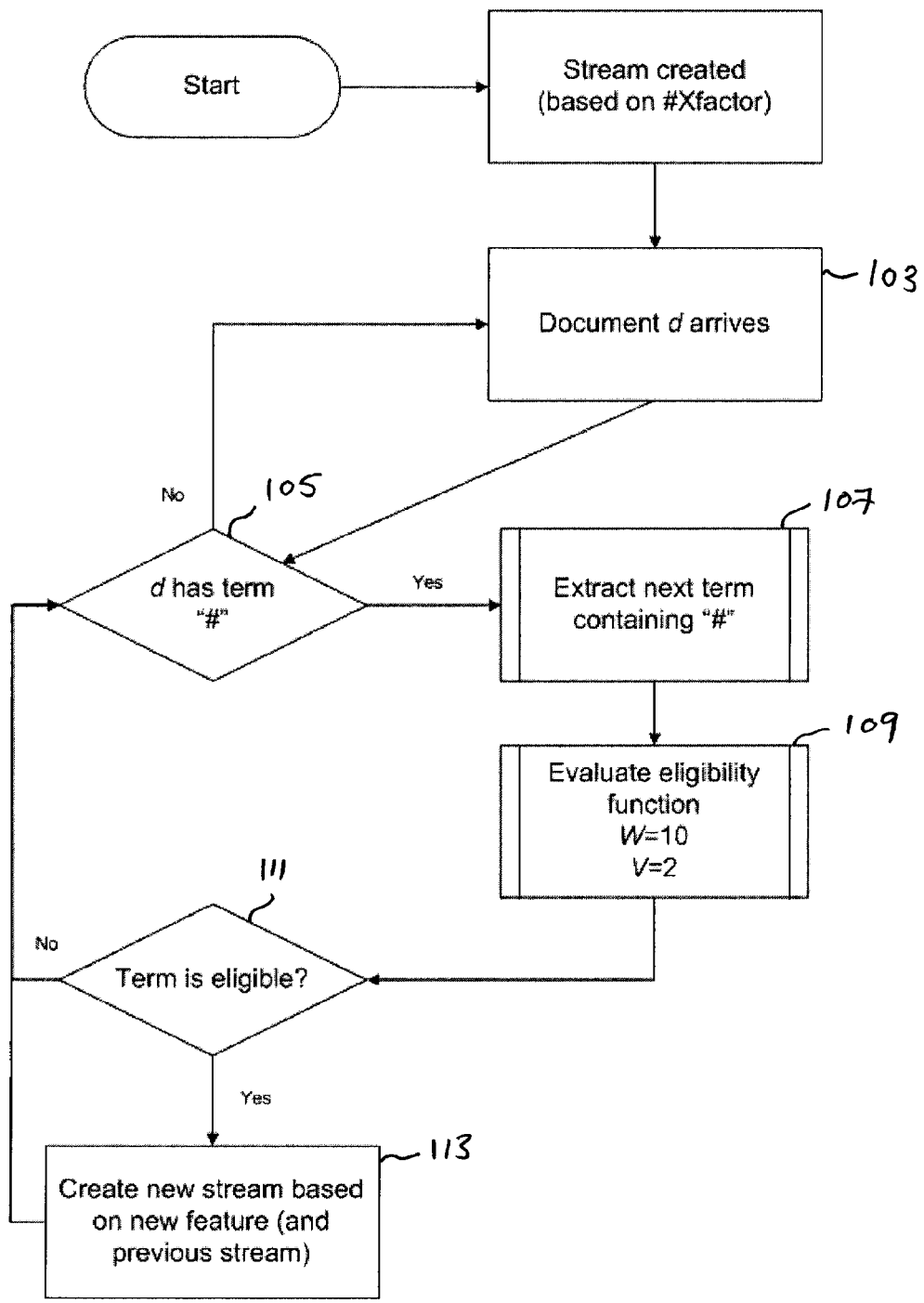
FIG. 4 is a further flow diagram illustrating the function of the adaptive search engine shown in FIG. 2.

An example implementation of the method described with reference to FIG. 3 will now be described with reference to FIG. 4. For simplicity, a social media platform such as Twitter provides the stream $S_0$, and the extracted terms will simply be hashtags (single word beginning with a prefix "#"). For the purposes of this example, a document d is a tweet, and a tweet is a simple text stream. The group communication filter 24 may search through at least a portion of the group communications as described above to check each communication for a set of hashtags which have been defined by a user. The group communication filter 24 thereby returns to the adaptive search engine 27 a stream of tweets which match the one or more hashtags. An absolute threshold eligibility function as described above is then used with a time window W of 10 seconds and a threshold value V of 2. Thus the function returns a Boolean "true" when more than two instances of a particular term have occurred in documents received within the last 10 seconds by the adaptive search engine 27. In this instance, the initial term which defines the steam is "#X-Factor".

1. A tweet arrives at step 103 at time T=0 seconds, with the following content:

"watching #X-Factor". At step 105 the adaptive search engine 27 checks whether the document contains the term #X-Factor and then at step 107 extracts that term. The term is then evaluated using the eligibility function which is dependent on the content of the current document and the previous documents received by the adaptive search engine 27. The term is compared with existing documents received in the last 10 seconds, of which there is only one and so it is found that X-Factor has appeared once. This is below the threshold value V of 2, so the eligibility function returns a Boolean "false" and at step 111 the term is deemed ineligible and the adaptive search engine returns to step 105.

2. A second tweet arrives in the steam at T=7 seconds, with the following content:

"OMG #X-Factor #Fagashbreath!". The hashtags #X-Factor and #Fagashbreath are caught at step 105 by the adaptive search engine and at step 107 these terms are extracted. At step 109, the eligibility function is used on each hashtag and again, the evaluation function returns a Boolean "false" for each because the threshold V value for each is 2 or below. At step 111 neither term is deemed eligible and so the adaptive search engine returns to step 105.

3. A third tweet arrives in the steam at T=18 seconds, with the following content:

"I can't believe there was #Fagashbreath on #X-Factor". Again, #X-Factor and #Fagashbreath are extracted at step 107 and, at step 109, the eligibility function is performed on both hashtags. However because the last two tweets were 11 seconds apart, the eligibility function returns a Boolean "false" and the adaptive search engine returns to step 105.

4. A fourth tweet arrives in the stream at T=19 seconds, with the following content:

"ha ha ha #Fagashbreath #X-Factor". Again, #X-Factor and #Fagashbreath are extracted. This time, however, at step 109, the eligibility function evaluates a true for both #Fagashbreath and #X-Factor because each of these terms have arrived in the stream more than twice in the last 10 seconds. Each term is then determined as eligible at step 111 and at step 113 a new stream is created by the group communication filter 24 which evaluates the incoming group communications based on the term #Fagashbreath and optionally based also on the term #X-Factor. The new stream may be delivered in parallel to the pre-existing stream, having only an single search term "#X-factor". Thus the resultant new stream may be tracking for the presence of either just the term #Fagashbreath or both the terms #Fagashbreath and #X-Factor in a single tweet. Alternatively the new stream may be delivered by itself, the pre-existing stream being discarded It should be noted that the terms "term" and "document" imply text based content. However the adaptive search engine 27 can be used on any data stream from which individual snap shots can be obtained, and terms extracted. For example, an alternative use might be to process a stream of images to look for a sudden spike in the number of times a particular face occurs, and to then alter the stream to include further images featuring that face. In this case, a document to be representative of an individual picture, and an extracted term may be an individual face from that picture. The adaptive search engine can then be used, for example, to automatically detect when a new person has joined a group of people, and to track such a person as an individual. The skilled person will appreciate that there are further applications of the adaptive search engine 27.

Sentiment Analysis

Sentiment analysis may then be performed on each of the program specific group communications (PSGCs) using a sentiment analyser 26, which receives data from the database 28 or directly from the output of the group communication filter 24. The sentiment analyser 26 may use any known method of sentiment analysis. For example, the sentiment analyser 26 may use Bayesian inference, a known method of statistical analysis based on Bayes' theorem, to categorise the sentiment of PSGCs. In which case, the sentiment analysis is advantageously implemented using a software based Bayes classifier tool such as that incorporated into the NLTK. The Bayes classifier is preferably initialised or trained with a predefined set of training strings, as will be appreciated by a person skilled in the art. This training may take place at any time. Optionally, the sentiment analyser 26 may be initialised periodically to take into account changes in inputted data. In an exemplary initialisation process, an initial training set of group communications is gathered and the sentiment of each PSGC is categorised by a person(s). That is, if a PSGC is generally positive towards a particular tagged keyword or key phrase, a human operator categorises the PSGC as having a positive sentiment towards that tag, and vice-versa. The sentiment analyser 26 accordingly learns which words and phrases tend to be positive and which tend to be negative and subsequently provides decisions based upon such memory.

Alternatively or additionally, an entity based approach to sentiment analysis may be employed. In which case, words with opinions contained in a PSGC are preferably extracted and the sentiment of each such word is analysed with reference to the tags contained in the PSGC. These extracted words may then analysed to determine their sentiment. For example, a word such as "evil" being negative, and a word such as "fantastic" being positive. A higher quantity of positive words contained in a PSGC may equate to a higher level of positive sentiment in that communication and in particular towards the tags contained in that communication. By way of non-limiting example, consider the communication:

"I love #Fiona Bruce on #Channel 4. She is an excellent presenter"

This communication contains the key phrase "Fiona Bruce" and "Channel 4", each prefixed with a "#" as described earlier. The communication also contains the words "love" and "excellent". Accordingly, the sentiment analyser 26 may determine that this tweet is positive towards Fiona Bruce and Channel 4. A skilled person will appreciate that other sentiment analysis techniques are available.

PSGCs are received by the sentiment analyser 26 either directly from the output of the group communication filter, or more preferably from the database 28. The sentiment analyser 26 may output a sentiment score, for example between −1, being completely negative and +1, being completely positive. This score may be based on the likelihood of the sentiment of each PSGC being generally positive or negative or on the quantity of positive words attributed to the tagged keywords and phrases contained in the PSGC.

The sentiment of each PSGC is then stored in the database 402 and linked to the PSGC and related program data.

In processing the decoded A/V data stream and data from the group communication network 30 in accordance with the above method, the communications interface 6 collates a set of data which preferably includes a list of group communications relating to the at least a portion of programs broadcast in the A/V broadcast. Accordingly, a list of attributes is linked to each of the processed group communications which may include keywords/phrases contained in the communication, associated program listings to which they relate, and/or a score of the sentiment of the communication. This data can then be analysed to determine a plurality of metrics relating to the sentiment of users of a particular group communications network 30. In particular, users' sentiment towards associated broadcasts, such as programs (Top Gear) or keywords and phrases, such as places (Kabul), people (Barak Obama) or things/products (Audi TT).

Extraction of Speech from A/V Broadcast

Referring now to FIG. 5, the decoded A/V data stream is passed from the receiver 4 to the audio/visual (A/V) data content extractor 8 which extracts content representing speech from the A/V data stream.

The A/V data content extractor 8 may extract, for example, program subtitles from A/V data stream. These subtitles may be soft, i.e. separate text strings marked with time stamps which are broadcast alongside the A/V content. In which case, the subtitle file can be easily extracted from the remainder of the A/V data stream and either stored in a database 42, or passed in real time to subsequent processing modules, such as the natural language analyser 38, for further analysis. In the case of the majority of digital TV broadcasts however, subtitles are pre-rendered, i.e. separate bitmap or jpeg images encoded into the A/V data stream. Accordingly, subtitle image frames may be extracted from the data stream and either stored in the database 42 or passed directly to an optical character recognition (OCR) module 32 for analysis. The OCR module 32 preferably uses a software OCR engine to process the subtitle image frames, for example Tesseract or any other OCR engine known in the art. The OCR module 32 converts characters visualised in the subtitle image frames into a speech related text stream (SRTS) which represents speech contained in an A/V broadcast. The speech related text stream may then be stored in the database 42 as text strings which preferably represent sentences of speech. Alternatively, the speech related text stream may be passed directly to subsequent processing modules, such as the natural language analyser 38, for further processing. In either case, the text strings are preferably tagged with a time stamp and any other information relevant to the A/V data source. In instances where the A/V data stream is a digital TV stream for example, tags may include channel and program information.

The audio signal may be passed to a voice recognition engine 34 to convert speech in the audio signal into a text stream. This is particularly applicable to embodiments where the broadcast is a digital radio broadcast or other broadcast comprising audio only, but could also be used alongside or as an alternative to OCR in full A/V data streams. The voice recognition engine 34 may incorporate any known software or hardware solution known in the art, an example of which is ANVIL (Annotation of Video and Language Data).

The speech related text stream, once extracted from the A/V data stream, is preferably stored in database 42 prior to being processed by the natural language analyser 38. Alternatively the speech related text stream is passed directly to the natural language analyser 38 for processing. The natural language analyser 38 functions in a similar manner to the natural language analyser 22 present in the communications interface 6. However, instead of receiving real time broadcast listings data the natural language analyser 38 receives the speech related text stream extracted from the A/V data stream. This data may be received directly from the OCR module 32 or the voice recognition engine 34. Preferably however, as mentioned above, this data is first stored in the database 42 and subsequently fed to the natural language analyser 38 for processing. Tagged keywords and phrases outputted from the natural language analyser 38 are preferably stored in the database 42 for future analysis. Advantageously, sentences related to those tagged keywords and phrases are also stored so that corresponding sentiment analysis can be performed as will be described in more detail below.

The database 42 may be linked to the database 28 of the communications interface 6. It will also be appreciated that the two databases 28, 42 could be implemented as a single database or other storage medium arranged to store information extracted by both the communications interface 6 and the A/V data content extractor 8.

Detecting Adverts in A/V Broadcast

The A/V data content extractor 8 may also be adapted to extract information regarding advertising, aired alongside and during A/V broadcasts. For example, for a TV or radio broadcast, the A/V data content extractor 8 may determine when a commercial break occurs within a program and may then identify the subject of each advert within that commercial break.

As will be known to the skilled person, a typical audio/visual advertising campaign may comprise one or more adverts, each of which may be broadcast multiple times over a set time period of, for example 2 weeks to 2 months. Using known audio/visual fingerprinting methods, it is possible to monitor an A/V broadcast and extract fingerprints of adverts broadcast which may then be stored in the database 42 which, as explained above, may be linked to, or the same as, the database 28 of the communications interface 6.

Figure 6:
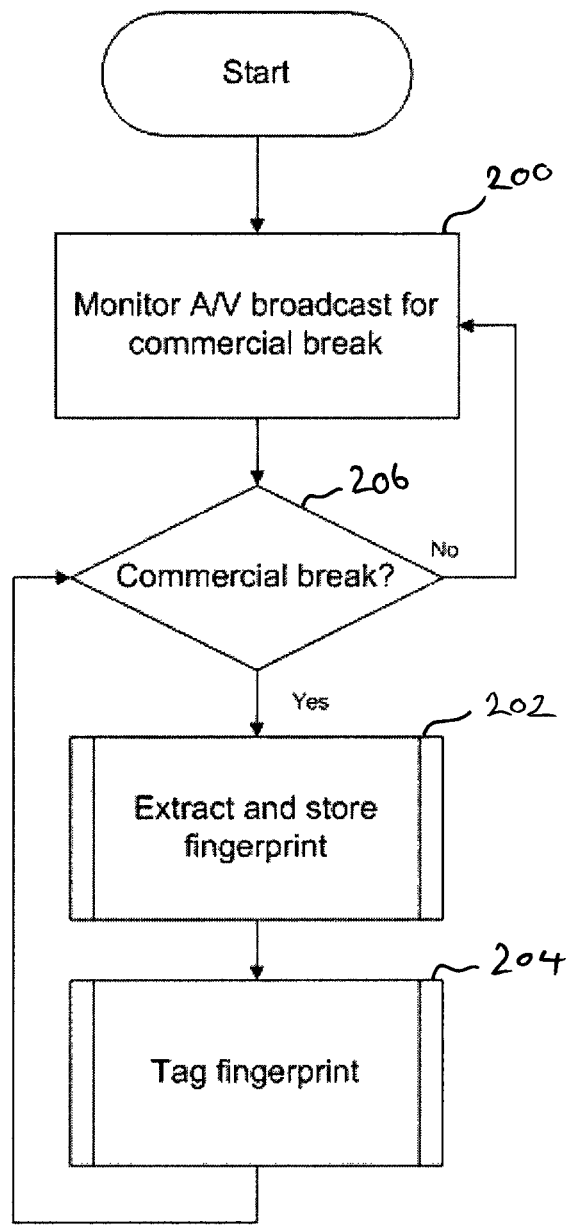
FIG. 6 is a flow diagram of a process of identifying and extracting fingerprints of commercial breaks from an audio/visual broadcast.

A method of extracting advert data from an A/V broadcast performed by the A/V data content extractor 8 is shown in FIG. 6. At step 200, the A/V data content extractor 8 monitors an A/V broadcast on a particular channel for the commencement of a commercial break in accordance with any known method. This may include looking for markers in the A/V stream which may designate the initiation of such breaks. The A/V data content extractor 8 continues to monitor the broadcast until a commercial break is detected. At which point, at step 202, video fingerprinting analysis is performed on the A/V stream using any number of visual or audio features of the stream, as is known in the art. These may include but are not limited to key frame analysis, and colour and motion changes during a video sequence, or stops and starts in conversation or music in an audio stream. Both audio and video fingerprints can then be extracted. Once a fingerprint is extracted for a particular video, at step 204, one or more tags may then be added to the extracted advert information which may relate to the subject of the advert concerned, the time of airing, the programme between which the advert was sandwiched or against which it was abutted, etc. Tags may be generated by extraction of speech from segments of the A/V broadcast which relate to a particular fingerprint and, as such, information concerning the subject of the advert to which the fingerprint relates can be extracted. Tags may additionally or alternatively be added by a human editor or any other known system. As soon as the system determines at step 206 that the A/V broadcast is no longer a commercial break, the process may move back to step 200, monitoring the A/V broadcast to detect the next commercial break.

The ability to identify the subject of an advert broadcast during a particular TV or radio programme allows for a temporal relationship to be established between adverts on an A/V broadcast and adverts delivered over a group communications network 30. For example, a company may be advertising a soft drink in an advert during a TV broadcast of a show such as Xfactor and may wish to direct the same advertising to viewers of Xfactor who are also using their group communications client to interact with a group communications network.

The methods and system described herein may publish messages to that viewer based on his use of the group communication client.

Figure 7:
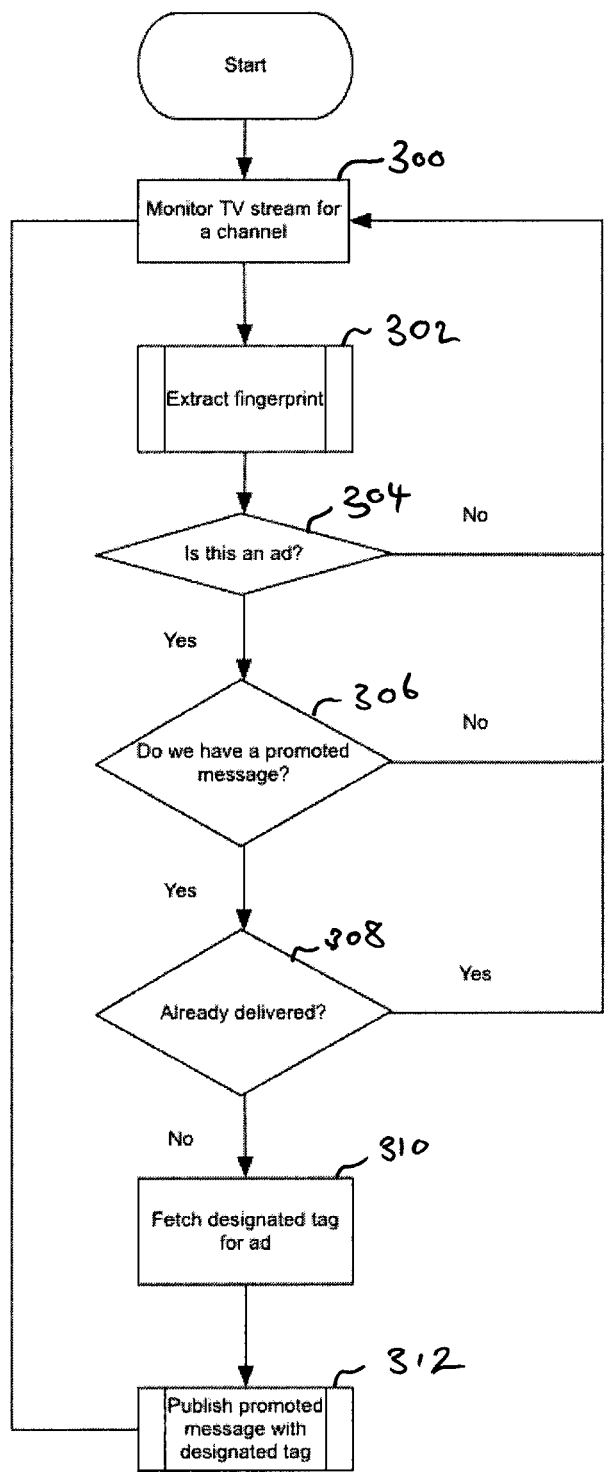
FIG. 7 is a flow diagram illustrating a process of detecting adverts in a live or near live broadcast.

A method of implementing synchronous advertising will now be described with reference to FIG. 7. A/V fingerprints, stored in the database 42, relating to an advert may be tagged with a marker signifying that the advertised product is to be subject to synchronous promotion on a group communication network. This marker may be added, for example, at the discretion of a company who wishes for a particular product to be synchronously advertised. At step 300, the A/V data content extractor 8 monitors an A/V stream of a particular broadcast and may extract fingerprints from the A/V broadcast in realtime or near realtime at step 302. Each fingerprint may then be checked, at step 304, against fingerprints of adverts stored and tagged in the database 42. If an extracted fingerprint does not form part of an advert, the process returns to step 300, monitoring the A/V stream. If the extracted fingerprint matches a fingerprint stored in the database 42, then at step 306 the database 42 is queried to see if the advert to which the fingerprint relates is to be promoted. This may be decided by checking the marker, as described above.

If the product which is the subject of the advert is to be promoted, a query is performed at step 308 as to whether this product has already been promoted. This check may include a specific query concerning one or more users of the group communication network, i.e. whether or not the a message concerning the product has been delivered to the one or more users who may be watching the broadcasted advert, e.g. published by the group communication publisher 25, as will be described in more detail below. Equally, the check may include a query directed generally to a particular search term, i.e. whether or not a promoted message concerning the product has been delivered at all to users who have searched for a tag designated to a particular advert, regardless of whether or not all users have been subject to the promoted message. Additionally or alternatively, the above two queries may be time dependent, i.e. has a promoted message concerning that product been delivered to users (specific or general users) within the last W seconds? Where the query at step 308 returns a "false", e.g. it is found that the advert has not already been delivered to the group communication network or particular users of the group communication network, the process moves to step 310. At step 310, one or more tags which have been linked to the add are fetched from the database 42. As mentioned above, these tags may include terms extracted by the A/V broadcast extractor, or by the natural language analyser 22 from the broadcast listings data or the A/V information itself, which may relate to a programme currently being monitored at step 300 by the A/V data content extractor 8. For example, consider a situation where the A/V broadcast is TV, the programme is the TV programme X-factor and the group communications network is twitter. Fetched tags may include "X-factor", "#X-factor", "#Xfactor", "#Fagashbreath" etc. Once these tags have been fetched, at step 312 messages containing these tags or relating to these tags may be published on the group communication network 30.

Delivery of a promoted message/advert to relevant users on the group communications network 30 for publishing may be achieved using any known method. A relevant user is a user monitoring one or more tags which relate to the A/V broadcast upon which the advert is or has aired. The group communication publisher 25 may send information concerning the advert data to be published and the tags to which it should be linked to the group communications network. The linked tags may include the fetched tags which relate to the programme currently airing on the A/V broadcast on which the fingerprinted advert is broadcast. These tags may include search terms or additional search terms extracted by the adaptive search engine 27, as described above. Promoted messages or adverts may then be published by the group communication publisher 25 or by a remote server from which the group communications network 30 is run. For example, where the group communications network 30 is Twitter, this remote server may be a main or subsidiary server belonging to Twitter.

Promoted messages from a company may be published in a message not containing any of tags linked to the advert. Instead, when a user searches such terms, the message may be promoted to the top of the search such that the user monitoring a particular tag will receive a promoted message from a company, but this message will not contain any reference to "X-factor", "#X-factor", "#Xfactor" or "#Fagashbreath" etc. Thus the advert on the A/V broadcast from which the fingerprint is extracted and matched may be synchronised with promoted messages on the group communication network.

The extent of publication of these messages may be dependent on the outcome of the query at step 308. For example, where it is found that some but not all of the set users of the group communications network who have searched for a particular tag have not been subject to a particular promoted message, the message may be delivered only to those users that have not yet seen the message. Once a promoted message is published, the process returns to step 300 and continues to monitor the channel.

An example of the method shown in FIG. 7 will now be described. Consider the scenario: A user is watching a television programme, for example Xfactor, and using his internet group communications network client, for example Twitter, on his laptop at the same time. The user is interested in what other people are saying about the programme, so he searches for 'Xfactor' in the client. The search returns a plurality of text strings or comments which relate to the show Xfactor. As he watches the show, comments which contain his search "Xfactor" stream onto his Twitter client which he continues to monitor over time. The TV programme then breaks for a commercial, during which an advert for a product appears on screen and within a few seconds the group communication publisher 25 sends a group communication containing at least a portion of the advert data to the group communications network 30. This group communication, containing a message relating to the advertised product, then appears in the user's Twitter stream on his Twitter client. The message may, for example, comprise a special offer that relates to the product being advertised. The user may then click on the link which will take him to a third party website to purchase the advertised product.

Sentiment Analysis of Extracted Data from A/V Broadcasts

As mentioned above, sentiment analysis may be performed on the sentences extracted from an A/V broadcast containing keywords/phrases tagged by the natural language analyser. To do so, those sentences must be stored and linked, for example using a pointer in a database to such keywords/phrases. Sentiment analysis may then be performed on the sentences by the sentiment analyser 40, using equivalent methods used by the sentiment analyser 26 for analysis of the PSGCs. In fact preferably, sentiment analyser 26 and sentiment analyser 40 are the same device. However, it will be appreciated by those skilled in the art that the initialisation of sentiment analysers 28, 40 may differ depending on the input data to be analysed.

As each sentence is analysed by the sentiment analyser 40, a sentiment score is preferably stored in the database 42 and linked to the corresponding keyword/phrase tags and/or sentences, so that further analysis can be performed in the future.

In processing the speech related text stream, the A/V data content extractor 8 collates a set of data which includes a list of sentences, labelled with tagged keywords or phrases contained in those sentences, a timestamp referring to when each sentence was broadcast and preferably a label denoting on which channel the A/V broadcast was received, and any other relevant information.

Referring again to FIG. 1, data extracted by the communications interface 6 and the A/V data content extractor 8 are correlated using a data correlator 10. The data correlator 10 preferably uses these data to create a more accurate representation of the sentiment of both group communications network users and speech sentences extracted from the A/V data stream.

In general, keywords or phrases tagged to program specific group communications (PSGCs) are matched against keywords tagged in sentences extracted from the speech related text stream (SRTS), herein referred to as SRTS tags. This correlation may be performed on a temporal or conceptual basis, or by any other suitable means. Preferably, temporal and conceptual correlations may both be performed on the same data, either simultaneously or one after the other.

Figure 8:
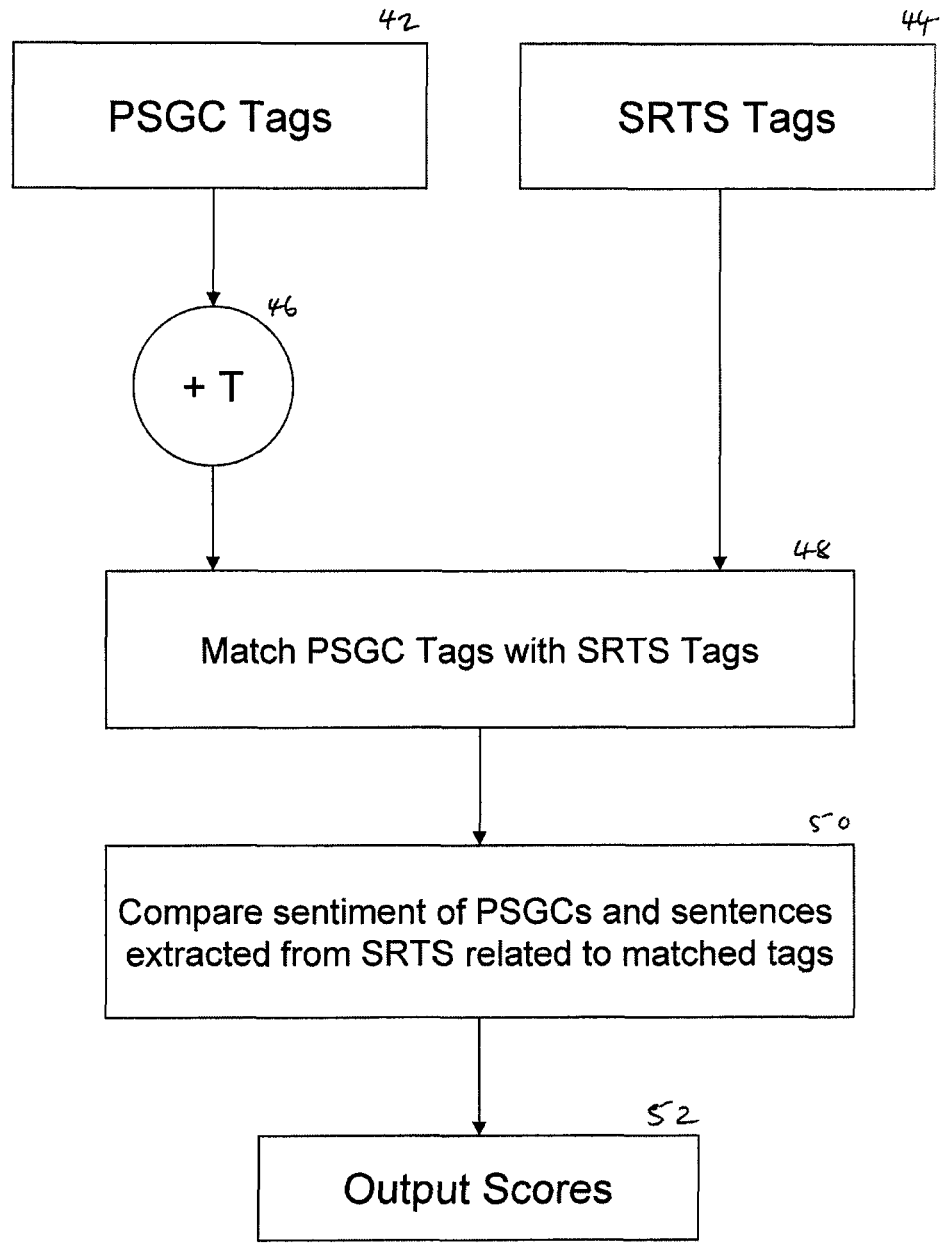
FIG. 8 is a process flow for the data correlator 10 of FIG. 1.

FIG. 8 illustrates a typical process flow for the data correlator 10 in accordance with a preferred embodiment of the present invention. PSGC tags 42 are matched with SRTS tags 44. Advantageously, a temporal weighting 46 is applied to the timestamp associated with the PSGC tags 42 in order to model an estimated time delay between the broadcast of A/V data stream, and the reaction of a user of a group communications network 30. For example, if at time T the show Top Gear is broadcast, in which Jeremy Clarkson is test driving the new Audi TT, it is likely that there will be some delay between a comment by Jeremy Clarkson about the Audi TT and a reaction of a user of a group communications network 30. Accordingly, an SRTS tag containing the phrase "Audi TT" captured at time t=T is not likely to match any of the PSGC tags 42 captured at time T. However, fifteen minutes later, i.e. at t=T+15 mins, data captured from the PSGC tags 42 is likely to be much more relevant. The range of this temporal correlation may be varied and information collected at multiple ranges, so that data on the effect of a particular event on a A/V broadcast on a population of users of a group communications network 30 can be analysed. Alternatively, the temporal weighting 46 may be set to a discrete value so that the effect of two different broadcast events can be compared.

A value of the number of any particular matched PSGC tag and SRTS tag may be determined and stored for future analysis or output. For example, where a large portion of the PSGCs contain a tag relating to a particular program, e.g. "Frozen Planet", there can be a higher confidence that people are talking about that particular program.

The predetermined sentiment score of PSGCs and sentences captured from the speech related text stream which are related to tags matched in the matching process step 48, may then be compared at process step 50. This matching process can then provide a further confidence metric as to whether the related sentiment scores are accurate and to what degree. For example, if the sentiment of a sentence captured from the SRTS and the sentiment of a PSGC are both positive, then there is a high confidence that the group communications network users and the person speaking about the same topic were in agreement.

Moreover, the sentiment comparison at process step 50 may be used increase the confidence of borderline sentiment scores. In particular, a sentence extracted from the SRTS may contain a plurality of different sentiments, each relating to different topic. For example, consider the following sentence which may have been extracted from the SRTS:

"I like Barak Obama, but I think his government is doing a terrible job".

The sentiment towards Barak Obama is positive but the sentiment towards his government is very negative. However, when combined with a matched PSGC which reads "I've got a lot of time for Barak Obama", the confidence of the positive sentiment towards Barak Obama is increased.

It will be appreciated that any combination of the above analysis methods in relation to data correlation could be implemented together with any other known correlation methods, to reach a set of statistical data for use in the comparison of any A/V broadcast with any group communications networks and implementation of the present invention is not limited to the aforementioned examples.

Results obtained by the data correlator 10 are preferably stored in a database for further future analysis.

It will be appreciated that any data extracted and stored in either database 28, 42 may later be analysed using any of the methods and/or apparatus components described.

The data obtained from analysis performed by the communications interface 6, the A/V data content extractor 8 and the data correlator 10 may be output or represented by the output engine 12 in a plurality of different formats. As illustrated in FIG. 1, these formats may include, but are not limited to an application program interface (API), a web interface or a custom report. The data may, for example, be integrated into an application program interface (API) which can then be used by subscribers to implement software modules utilising the data. Alternatively, data may be output using an interactive graphical web interface, where subscribed web users can view information which may be program or keyword specific depending on their needs. As a further alternative, a custom report may be generated based on a subscribers requirements. In all of the above embodiments, the generated output can be tailored to a specific end user/subscriber's needs. The output could be tailored to a company, person, place of interest, TV or radio program, or product to list a few non-limiting examples.

Figure 9:
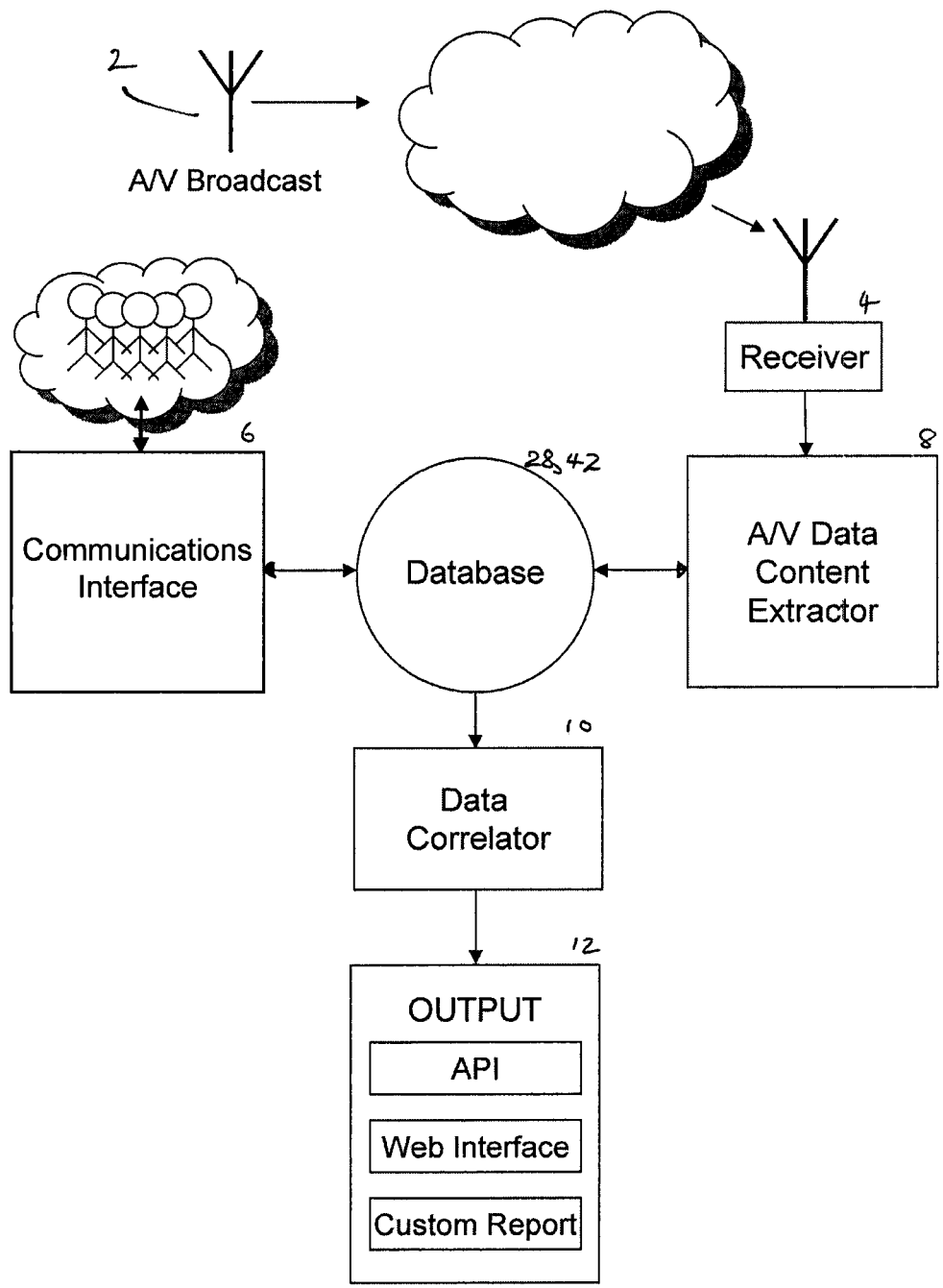
FIG. 9 is a block diagram of a broadcast reporting system according to a variation of the present invention.

Embodiments of the invention have been explained primarily with reference to FIG. 1 which shows an overview of the architecture of the apparatus in accordance with one embodiment of the invention. However, this embodiment is not limiting. More specifically, in the embodiment shown in FIG. 1, the communications interface 6 and the A/V data content extractor 8 may both contain databases which could be one and the same. Moreover, since the broadcast listings extractor 20 is located in the communications interface 6, this extractor requires an input from the receiver 4. In an alternative embodiment however, as shown in FIG. 9 where like parts are labelled with like numbers, the database 28, 42 may be implemented as a separate module connected both to the communications interface 6 and the A/V data content extractor 8. Moreover, the broadcast listings extractor 20 and the natural language analyser 22 may be incorporated into the A/V data content extractor 8, thereby removing the need to feed both extractors 6, 8 with data from the receiver 4. Further, the natural language analyser 22 and the natural language analyser 38 may be implemented as a single natural language analyser receiving inputs from the OCR module 32, the voice recognition engine 34, the S/L transcription engine 36 and the broadcast listings extractor 20.

Figure 10:
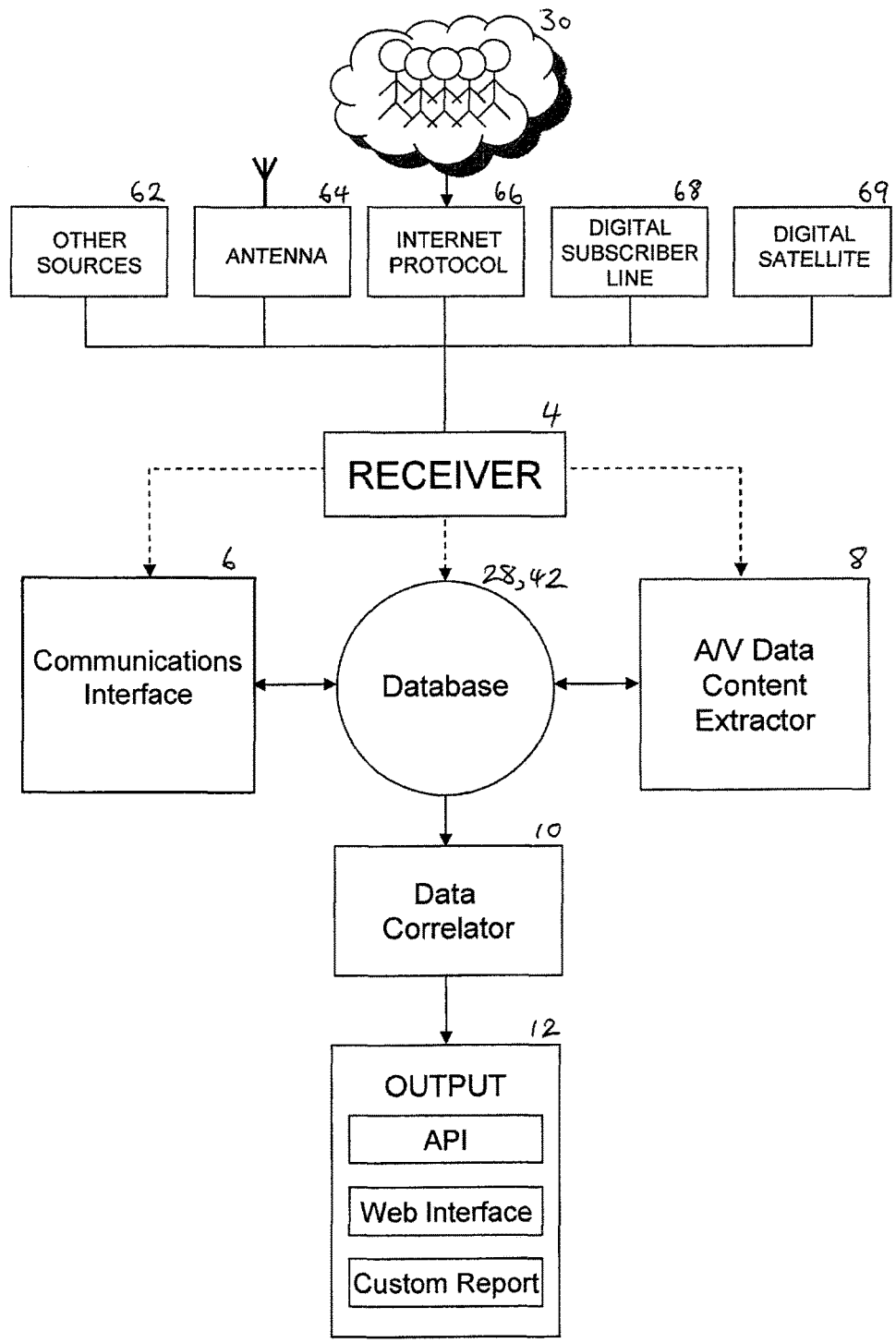
FIG. 10 is a block diagram of a broadcast reporting system according to a variation of the present invention.

A further alternative embodiment is shown in FIG. 10. Similar to the embodiment described above with reference to FIG. 9, the broadcast listings extractor 20 and the natural language analyser 22 may be incorporated into the A/V data content extractor. However, the receiver 4 is configured to receive all broadcast data, which may include, for example, broadcast listings data and A/V broadcast data, and group communications data from a group communications network. The receiver 4 is preferably operable to receive data via an antenna 64, an internet protocol (IP) 66, a digital subscriber line 68, a digital satellite 69 or any other source 62. Any combination of data type and communication protocol may be used by the receiver 4 to receive data. For example, as a non-limiting example only, the receiver may be configured to receive group communications from a group communications network 30 via an internet protocol 66. In addition or alternatively, the receiver 4 may receive subtitle data via a digital subscriber line 68. The receiver 4 may then be operable to transfer data to one or more of the communications interface 6, the database 28, 42 and the A/V data content extractor 8.

Figure 11:
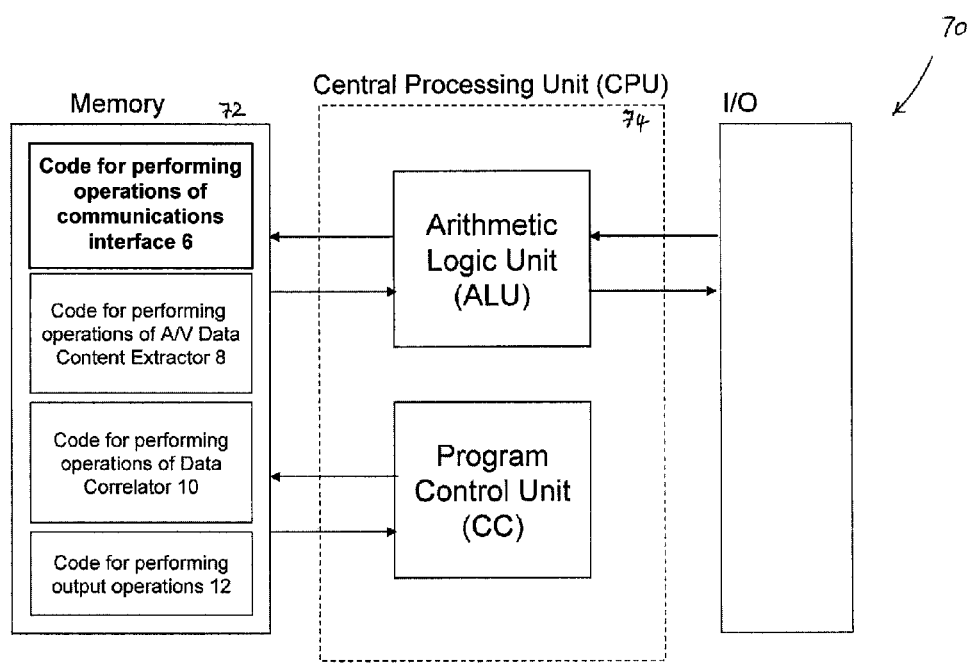
FIG. 11 illustrates a general purpose computer/server for implementation of the present invention according to FIG. 1.

With reference again to FIG. 1, it will be appreciated that the operation of the communications interface 6, the A/V data content extractor 8, the data correlator 10 and the output 12 could be implement using dedicated hardware or alternatively implemented using any known general purpose computer/server, for example the computer 70 illustrated in FIG. 11. Software code may be loaded into a memory 72 containing instructions for performing the operations of the communications interface 6, the A/V data content extractor 8, the data correlator 10 and the output 12. The computer 70 further comprises a central processing unit (CPU) 74 for performing instructions loaded in the memory 72, and an input/output (I/O) bus arranged to receive the A/V data stream, and group communications for one or more group communications networks as will be appreciated by a person skilled in the art. Although in the above embodiment all of the communications interface 6, the A/V data content extractor 8, the data correlator 10 and the output 12 are implemented on a single computer, it will be appreciated that one or more of these modules could be implemented on a separate computer or server system, any one computer or server being located remotely, the remote computers/servers communicating between each other in any manner known in the art.

The invention claimed is:

1. An apparatus comprising:
a receiver for receiving broadcast data;
a communications interface in communication with a group communications network;
a broadcast data content extractor responsive to the receiver and adapted to receive a data stream corresponding to currently broadcast programming and extract content from the data stream, use the extracted content to derive a set of tags relating to the currently broadcast programming, and derive advertisement data from the received data stream corresponding to the currently broadcast programming, the advertisement data relating to an advertisement, wherein the advertisement data is derived contemporaneously with the corresponding broadcast of the advertisement;
an adaptive search engine configured to use the derived set of tags and a stream of communication documents to derive one or more search terms, wherein deriving the one or more search terms includes:
identifying communication documents having one or more prefix-appended terms that match corresponding tags in the set of tags, and
determining whether the one or more prefix-appended terms satisfy a threshold rate of occurrence within the stream of communication documents; and
wherein on receipt of a query received from a user account at the group communications network for documents posted on the group communications network, the query comprising one or more search terms comprising one or more of the derived prefix-appended search terms, the communications interface publishes a group communication to the user account on the group communications network comprising at least a portion of the derived advertisement data.

2. An apparatus according to claim 1, wherein the group communication is returned as a result of the query.

3. An apparatus according to claim 1, wherein the set of tags are derived from broadcast listings data extracted from the received broadcast data.

4. An apparatus according to claim 1, wherein the group communication is published within a time period T from receipt of the advertisement data from the receiver.

5. An apparatus according to claim 1, wherein the group communication published on the group communication network is visible only to users who have not viewed a related group communication comprising the portion of the advertisement data.

6. An apparatus according to claim 1, wherein a particular prefix-appended term is extracted based on the frequency of the prefix-appended term appearing in the stream of communications over a period W.

7. An apparatus according to claim 1, wherein extraction of each prefix-appended term depends on a probability of the prefix-appended term appearing in the stream of communications, the probability based on the frequency of the prefix-appended term appearing in a previously received and filtered stream of communications.

8. An apparatus according to claim 1, wherein the advertisement data comprises a broadcast time and a subject of the advertisement.

9. An apparatus according to claim 1, wherein the broadcast data is received using one or more of an antenna, an internet protocol, a digital subscriber line, a digital cable, a digital satellite, or a user input.

10. An apparatus according to claim 1, wherein the broadcast data includes one or more of a subtitle stream, an audio stream, a video stream, or broadcast listings data.

11. An apparatus according to claim 1, wherein the broadcast data is extracted from a live broadcast or a non-live broadcast stored on a storage medium.

12. An apparatus according to claim 1, wherein the group communications network is a social media network.

13. A method comprising:
receiving a data stream corresponding to currently broadcast programming;
extracting content from the data stream and using the extracted content to derive a set of tags relating to the currently broadcast programming;
receiving a stream of communication documents from a group communications network using a communication interface;
using the derived set of tags and the received stream of communications to derive one or more search terms, wherein deriving the one or more search terms includes:
identifying communication documents having one or more prefix-appended terms that match corresponding tags in the set of tags, and
determining whether the one or more prefix-appended terms satisfy a threshold rate of occurrence within the stream of communication documents;
deriving advertisement data from the received data stream corresponding to the currently broadcast programming, the advertisement data relating to an advertisement, wherein the advertisement data is derived contemporaneously with the corresponding broadcast of the advertisement; and
in response to a query from a user account at the group communications network for docunaents posted on the group communications network, the query including one or more search terms comprising one or more of the derived prefix-appended search terms, publishing a group communication to the user account on the group communications network comprising at least a portion of the derived advertisement data.

14. A method according to claim 13, wherein the group communication is returned as a result of the query.

15. A method according to claim 13, wherein the set of tags are derived from broadcast listings data extracted from the received broadcast data.

16. A method according to claim 13, wherein a particular prefix-appended term is extracted based on the frequency of the prefix-appended term appearing in the stream of communications over a period W.

17. A method according to claim 13, wherein extraction of each prefix-appended term depends on a probability of the prefix-appended term appearing in the stream of communications, the probability based on the frequency of the prefix-appended term appearing in a previously received and filtered stream of communications.

18. A method according to claim 13, wherein the advertisement data comprises a broadcast time and a subject of the advertisement.

19. A method according to claim 18, wherein the subject of the advertisement data and the subject of the advertisement are the same subject.

20. The method of claim 13, wherein the group communication is published within a time period T from receipt of the advertisement data from the receiver.

21. The method of claim 13, wherein the group communication published on the group communication network is visible only to users who have not viewed a related group communication comprising a portion of the advertisement data.

22. A non-transitory computer-readable storage medium comprising instructions for publishing a group communication that when executed cause a processor to:
receive a data stream corresponding to currently broadcast programming;
extracting content from the data stream and using the extracted content to derive a set of tags relating to the currently broadcast programming;
receive a stream of communication documents from a group communications network using a communication interface;
using the derived set of tags and the received stream of communications to derive one or more search terms, wherein deriving the one or more search terms includes:
identifying communication documents having one or more prefix-appended terms that match corresponding tags in the set of tags, and
determining whether the one or more prefix-appended terms satisfy a threshold rate of occurrence within the stream of communication documents;
derive advertisement data from the received data stream corresponding to currently broadcast programming, the advertisement data relating to an advertisement, wherein the advertisement data is derived contemporaneously with the corresponding broadcast of the advertisement; and
in response to a query from a user account at the group communications network for documents posted on the group communications network, the query including one or more search terms comprising one or more of the derived prefix-appended search terms, publish a group communication to the user account on the group communications network comprising at least a portion of the derived advertisement data.

23. The non-transitory computer-readable storage medium of claim 22, wherein the group communication is returned as a result of the query.

24. The non-transitory computer-readable storage medium of claim 22, wherein the set of tags are derived from broadcast listings data extracted from the received broadcast data.

25. The non-transitory computer-readable storage medium of claim 22, wherein a particular prefix-appended term is extracted based on the frequency of the prefix-appended term appearing in the stream of communications over a period W.

26. The non-transitory computer-readable storage medium of claim 22, wherein extraction of each prefix-appended term depends on a probability of the prefix-appended term appearing in the stream of communications, the probability based on the frequency of the prefix-appended term appearing in a previously received and filtered stream of communications.

27. The non-transitory computer-readable storage medium of claim 22, wherein the group communication is published within a time period T from receipt of the advertisement data from the receiver.

28. The non-transitory computer-readable storage medium of claim 22, wherein the group communication published on the group communication network is visible only to users who have not viewed a related group communication comprising a portion of the advertisement data.

* * * * *

UNITED STATES PATENT AND TRADEMARK OFFICE
CERTIFICATE OF CORRECTION

PATENT NO. : 10,282,750 B2
APPLICATION NO. : 14/374217
DATED : May 7, 2019
INVENTOR(S) : Daniel Fairs et al.

Page 1 of 1

It is certified that error appears in the above-identified patent and that said Letters Patent is hereby corrected as shown below:

In the Claims

Column 19, Line 61, Claim 13, delete "documents:" and insert -- documents; --, therefor.

Column 20, Line 2, Claim 13, delete "docunaents" and insert -- documents --, therefor.

Signed and Sealed this
Third Day of November, 2020

Andrei Iancu
*Director of the United States Patent and Trademark Office*